(12) United States Patent
Draznin et al.

(10) Patent No.: US 11,743,735 B2
(45) Date of Patent: Aug. 29, 2023

(54) FEMTOCELL BASE STATION, CELLULAR SYSTEM AND METHOD

(71) Applicant: Rakuten Mobile, Inc., Tokyo (JP)

(72) Inventors: Sagiv Draznin, Tokyo (JP); Tareq Amin, Tokyo (JP); Sharad Sriwastawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 145 days.

(21) Appl. No.: 17/183,352

(22) Filed: Feb. 24, 2021

(65) Prior Publication Data

US 2021/0266754 A1 Aug. 26, 2021

Related U.S. Application Data

(60) Provisional application No. 62/981,467, filed on Feb. 25, 2020.

(51) Int. Cl.
| | |
|---|---|
| *H04W 16/14* | (2009.01) |
| *H04W 64/00* | (2009.01) |
| *H04W 48/16* | (2009.01) |
| *H04W 52/36* | (2009.01) |
| *H04W 84/04* | (2009.01) |

(52) U.S. Cl.
CPC .......... *H04W 16/14* (2013.01); *H04W 48/16* (2013.01); *H04W 52/36* (2013.01); *H04W 64/003* (2013.01); *H04W 84/045* (2013.01)

(58) Field of Classification Search
CPC . H04W 84/045; H04W 64/003; H04W 52/36; H04W 48/16; H04W 16/14
See application file for complete search history.

(56) References Cited

U.S. PATENT DOCUMENTS

| | | | | |
|---|---|---|---|---|
| 9,161,231 | B2 * | 10/2015 | Buddhikot | ............ H04W 16/10 |
| 2009/0276298 | A1 * | 11/2009 | Tsai | .................... H04N 21/4788 |
| | | | | 705/14.1 |
| 2012/0120887 | A1 * | 5/2012 | Deaton | ................. H04W 16/14 |
| | | | | 370/329 |
| 2015/0206228 | A1 * | 7/2015 | Perez | ................. G06Q 30/0278 |
| | | | | 709/204 |
| 2019/0259092 | A1 * | 8/2019 | Oktay | ................... H04W 28/20 |
| 2020/0029250 | A1 * | 1/2020 | Ibek | ...................... H04L 9/0618 |

* cited by examiner

*Primary Examiner* — Dai Phuong
(74) *Attorney, Agent, or Firm* — HAUPTMAN HAM, LLP

(57) ABSTRACT

In a method of operating a portable access node, a lease request is transmitted to lease a portion of a communication resource assigned to but not used by a local communication system, where the portable access node is located within a coverage area of the local communication system. Upon receiving a response granting the lease request, a communication service using the leased portion of the communication resource is provided.

20 Claims, 4 Drawing Sheets

FEMTOCELL BASE STATION, CELLULAR SYSTEM AND METHOD

CROSS-REFERENCE TO RELATED APPLICATION

This application claims the benefit of U.S. Provisional Patent Application No. 62/981,467 filed on Feb. 25, 2020, the content of which is incorporated by reference herein in its entirety.

BACKGROUND

Recently, mobile terminals such as smart phones, laptops, tablets, gaming consoles or the like, have become increasingly popular for work, entertainment, social networking or the like. There is also a tendency that users of mobile terminals travel from one region to another or from one country to another, with the expectation that they have access to various communication services provided through their mobile terminals in any place and/or at any time. In some situations, roaming becomes a concern as traveling users are likely charged more by a local communication system for the same communication services and/or subject to service limitations, when they are outside a coverage area of a home communication system to which they subscribe.

SUMMARY

A method of operating a portable access node according to the present disclosure comprises: transmitting a lease request to lease a portion of a communication resource assigned to but not used by a local communication system, wherein the portable access node is located within a coverage area of the local communication system; and upon receiving a response granting the lease request, providing a communication service using the leased portion of the communication resource.

A femtocell base station according to the present disclosure comprises: cellular transceiving circuitry; network interface circuitry; and a processor configured to: control the cellular transceiving circuitry to scan for a local access node at a location of the femtocell base station, upon discovering at least one local access node at the location of the femtocell base station, control the network interface circuitry to transmit, to a frequency repository server associated with the at least one local access node, a lease request to lease a portion of a radio frequency spectrum of the at least one local access node, and upon receiving a response granting the lease request, control the cellular transceiving circuitry to perform cellular communication over the leased portion of the radio frequency spectrum.

A cellular system according to the present disclosure comprises: a home communication system configured to provide a cellular communication service to mobile terminals subscribed to the home communication system; and a femtocell base station arranged outside a coverage area of the home communication system, and configured to lease an unused portion of a radio frequency spectrum of a local communication system which is different from the home communication system, the femtocell base station located within a coverage area of the local communication system, and provide, over the leased portion of the radio frequency spectrum of the local communication system, the cellular communication service to a first, roaming mobile terminal subscribed to the home communication system but located within the coverage area of the local communication system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
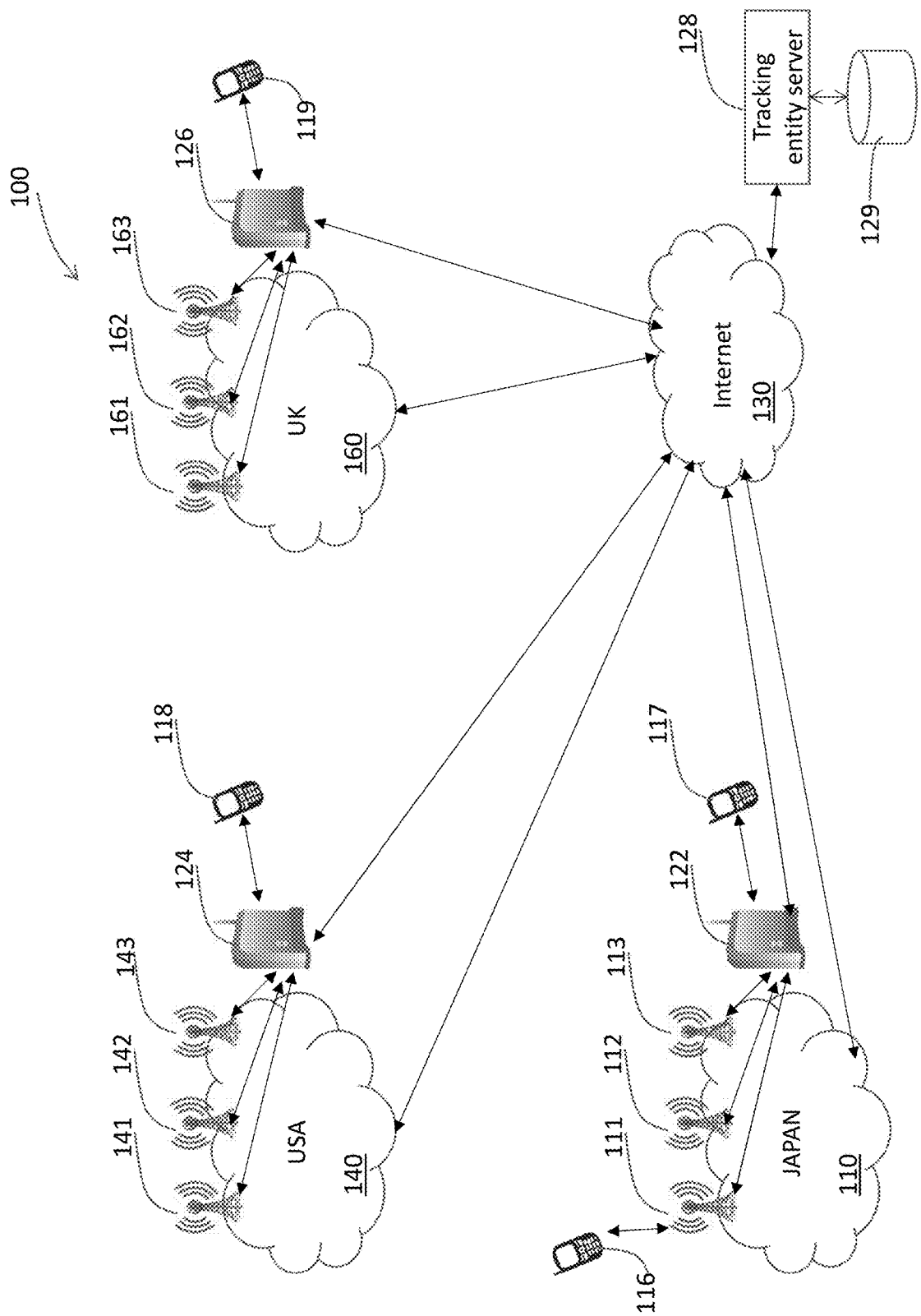
FIG. 1 is a block diagram of a cellular system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

To reduce or mitigate issues associated with roaming, some embodiments provide a portable access node located within a coverage area of a local communication system where one or more mobile terminals subscribing to a home communication system are roaming. The portable access node transmits a lease request to lease a portion of a communication resource assigned to, but not used by, the local communication system. Upon receiving a response granting the lease request, the portable access node provides a communication service using the leased portion of the communication resource. Accordingly, it is possible in at least one embodiment for the roaming mobile terminals to receive in-network communication services of the home communication system without roaming fees and/or roaming-related service limitations.

FIG. 1 is a block diagram of a cellular system 100, in accordance with some embodiments. The cellular system 100 comprises a home communication system 110, one or more portable access nodes 122, 124, 126, and a tracking entity server 128. The described components of the cellular system 100 are coupled with each other via a network, such as the Internet 130. Other network configurations, including, but not limited to, proprietary networks, virtual private networks (VPNs), for coupling the components of the cellular system 100 are within the scopes of various embodiments. In at least one embodiment, the tracking entity server 128 is part of the home communication system 110.

The home communication system 110 is configured to provide a cellular communication service to mobile terminals 116, 117, 118, 119 which subscribe to the home communication system 110. The mobile terminals 116, 117, 118, 119 are also referred to herein as subscribing mobile terminals. The home communication system 110 comprises a plurality of base stations or access nodes 111, 112, 113 configured to perform cellular communication with subscribing mobile terminals, such as the mobile terminals 116, 117, which are physically located within coverages areas of one or more of the access nodes 111, 112, 113. The coverages areas of the access nodes 111, 112, 113 together define a coverage area of the home communication system 110. The coverage area of an access node depends on various factors, such as transmission power and/or structure of one or more antennas of the access node. For example, a high power access node, or base station, with one or more antennas mounted at a great height on ground-based masts, rooftops and other existing structures is capable of providing a coverage area of a radius of about 2 km and up. Such wide coverage areas are referred to as macrocells. Lower power access nodes, or base stations, provide narrower coverage areas, or cells, which include microcells of up to 2 km in radius, picocells of up to 200 m in radius, and femtocells of up to a few tens m in radius. In an example configuration, the access nodes 111, 112, 113 include a combination of macrocell base stations, microcell base stations, picocell base stations and femtocell base stations which are configured to provide macrocells, microcells, picocells and femtocells, respectively. The above specific numeric sizes of coverage areas of macrocells, microcells, picocells and/or femtocells are examples, and other sizes and/or configurations of macrocells, microcells, picocells and/or femtocells are within the scopes of various embodiments.

The portable access nodes 122, 124, 126 are configured to provide the same or similar functionality as the access nodes 111, 112, 113. Unlike the access nodes 111, 112, 113 which are configured to provide the coverage area for the home communication system 110 and are often fixed or stationary (except for certain picocell base stations and/or femtocell base stations), the portable access nodes 122, 124, 126 are configured to be carried and installed outside the coverage area of the home communication system 110 to serve roaming mobile terminals of the home communication system 110. In an example configuration, one or more of the portable access nodes 122, 124, 126 are femtocell base stations which have physical dimensions similar to those of a residential Wi-Fi router or broadband modem. Other configurations are within the scopes of various embodiments. For sake of simplicity, portable access nodes are referred hereinafter as femtocell base stations. However, the coverage area of the portable access nodes 122, 124, 126 is not necessarily limited to that of a femtocell, and is configurable to cover various areas such as one or more rooms in a house or apartment, one or more houses or apartments, one or more floors in a building, or the like.

Examples of mobile terminals 116, 117, 118, 119 include, but are not limited to, cell phones, tablets, media players, gaming consoles, personal data assistants (PDAs), laptops, and other electronic devices configured to transmit and/or receive cellular communication to/from various access nodes of the home communication system 110 or other cellular communication systems. An example hardware configuration of the mobile terminals 116, 117, 118, 119, access nodes 111, 112, 113, and portable access nodes 122, 124, 126 is described herein with respect to FIG. 4. Examples of communication technologies for performing cellular communication include, but are not limited to, 2G, 3G, 4G, 5G, GSM, EDGE, WCDMA, HSPA, CDMA, LTE, DECT and WiMAX. Examples of services provided over cellular communication, herein referred to as cellular communication services, include, but are not limited to, voice calls, data, emails, messages such as SMS and MMS, applications, and control signals.

The home communication system 110 further comprises a core network (not shown) configured to operate with the access nodes 111, 112, 113 and portable access nodes 122, 124, 126 to provide the subscribing mobile terminals with various cellular communication services. Example components of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the access nodes 111, 112, 113 by one or more networks. An example hardware configuration of the components of the core network as well as the tracking entity server 128 is also described herein with respect to FIG. 4, with a distinction from the access nodes and mobile terminals in that cellular transceiving circuitry is omitted from the components of the core network and the tracking entity server 128 in at least one embodiment.

As noted herein, when users travel, there are situations where mobile terminals of such traveling users are roaming. In the example configuration in FIG. 1, the mobile terminals 116, 117 are located within the coverage area of the home communication system 110, e.g., in Japan, and receive cellular communication services via the access nodes 111, 122, respectively. In other words, the mobile terminals 116, 117 are not roaming. However, the mobile terminals 118, 119 are located outside the coverage area of the home communication system 110, and are roaming. Specifically, the mobile terminal 118 is located in a coverage area covered by base stations or access nodes 141, 142, 143 of a local communication system 140 at the current location, e.g., USA, of the mobile terminal 118. The mobile terminal 119 is located in a coverage area covered by base stations or access nodes 161, 162, 163 of another local communication system 160 at the current location, e.g., UK, of the mobile terminal 119. In an example, the local communication systems 140, 160 and the respective access nodes 141, 142, 143, 161, 162, 163 are configured similarly to the home communication system 110 and the access nodes 111, 112, 113. Each of the communication systems 110, 140, 160 has one or more communication resources specifically assigned to that communication system. An example of a communication resource assigned to a communication system is a radio frequency (RF) spectrum over which access nodes of the communication system are permitted to perform cellular communication. A communication system that obtains a license for a part of the RF spectrum from a regulation authority, such as the Federal Communications Commission (FCC) in USA, becomes the "owner" of the licensed part of the RF spectrum, and is referred to in some situations as Mobile Network Operator (MNO). A communication system that does not "own" a licensed part of the RF spectrum but instead operates over a part of the RF spectrum leased from an MNO is referred to in some situations as Mobile Virtual Network Operator (MVNO). For sake of simplicity, hereinafter both MNO and MVNO are referred to as MNO. When a mobile terminal subscribing to one communication system, or MNO, is roaming in the coverage area of and receives cellular communication services from another communication system, roaming charges and/or roaming-related service limitations (such as upload/download speed and/or data mount limits) are often imposed on the roaming mobile terminal.

To obviate roaming charges and/or roaming-related service limitations, the portable access nodes 124, 126 are deployed to serve roaming mobile terminals 118, 119, by leasing a unused portion of a communication resource from the local communication systems 140, 160, and providing cellular communication services to the roaming mobile terminals 118, 119 over the leased portion of the communication resource. In one or more examples specifically described herein, the communication resource to be leased includes the RF spectrum assigned to the local communication system 140 or 160. However, in accordance with various embodiments, one or more other communication resources, such as time, code, direction (space), or the like, are leasable in addition to or in lieu of RF spectrum, depending, for example, on the communication access technology employed at the local communication system 140 or 160. Examples of communication access technologies include, but are not limited to, frequency division multiple access (FDMA), time division multiple access (TDMA), code division multiple access (CDMA), orthogonal frequency division multiple access (OFDMA), and spatial division multiple access (SDMA).

Figure 2:
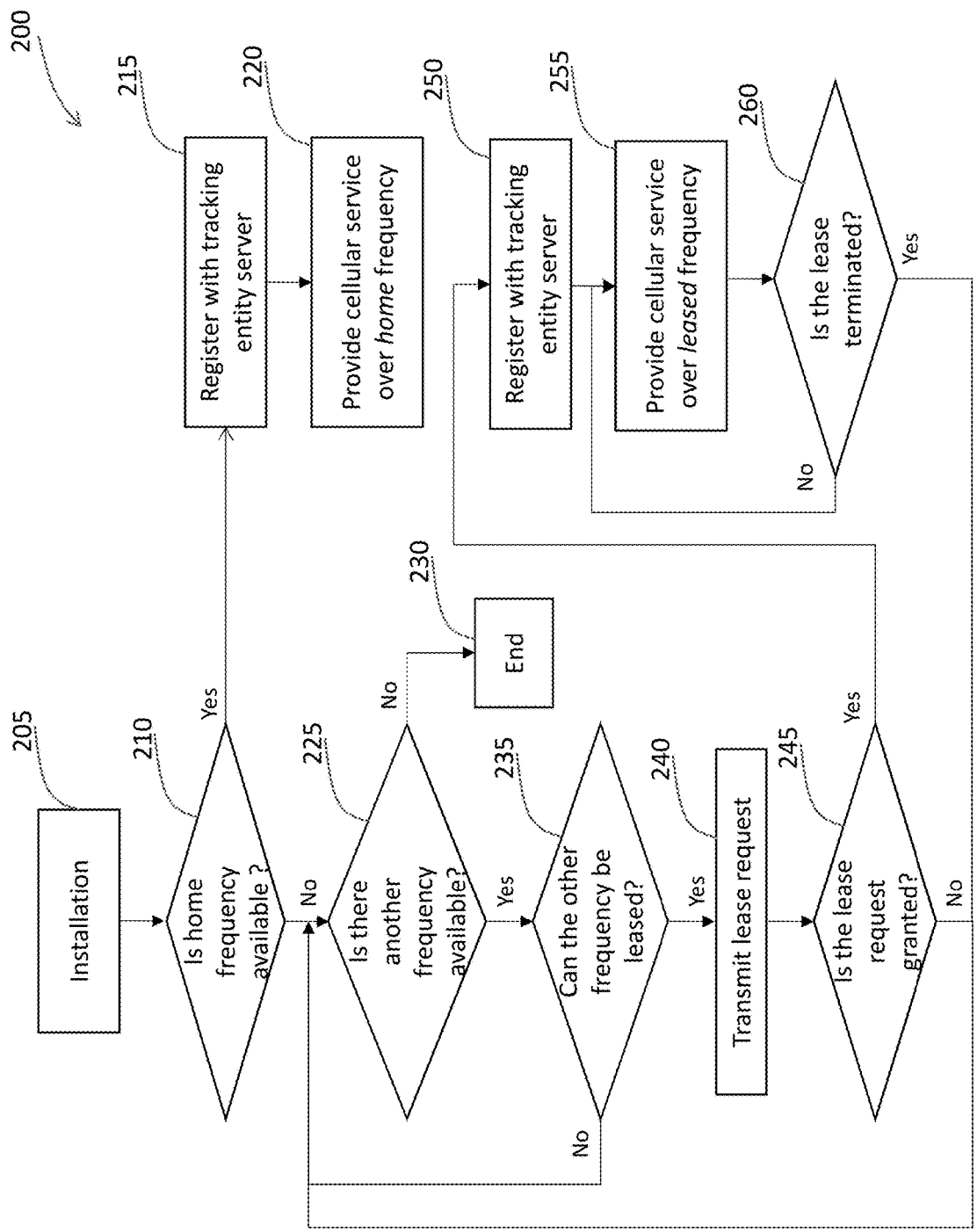
FIG. 2 is a flowchart of a method of operating a portable access node of a cellular system, in accordance with some embodiments.

FIG. 2 is a flowchart of a method 200 of operating the portable access node 124 in the cellular system 100, in accordance with some embodiments. Operations at the portable access node 124 are performed at least by a processor, network interface circuitry and cellular transceiving circuitry of the portable access node 124. A detailed description of hardware or structure of the processor, network interface circuitry and cellular transceiving circuitry of the portable access node 124 is given with respect to a processor 401, network interface circuitry 404 and cellular transceiving circuitry 405 in FIG. 4, respectively. The other portable access nodes 122, 126 are similarly configured and/or operated.

At operation 205, the portable access node 124 is installed. For example, the portable access node 124 is powered on, and the network interface circuitry of the portable access node 124 is connected to the Internet 130.

At operation 210, the portable access node 124 checks whether a home radio frequency is available. For example, the processor of the portable access node 124 controls its cellular transceiving circuitry to perform a frequency scan for any access node whose cellular signal is available at the location of the portable access node 124. The processor of the portable access node 124 determines whether a cellular signal discovered by the frequency scan belongs to an access node of the home communication system 110, based on the RF spectrum over which the cellular signal was received as well as other data transmitted with the cellular signal. When an access node of the home communication system 110 is found (Yes from operation 210), the processor of the portable access node 124 determines that the portable access node 124 is at home, i.e., within the coverage area of the home communication system 110 (similarly to the portable access node 122 in FIG. 1), and proceeds to operation 215. Otherwise (No from operation 210), the processor of the portable access node 124 determines that the portable access node 124 is roaming, and proceeds to operation 225.

At operation 215, the portable access node 124 registers with the tracking entity server 128. For example, the processor of the portable access node 124 controls its network interface circuitry to transmit, via the Internet 130, a registration message to the tracking entity server 128. Upon receiving the registration message, the tracking entity server 128 registers the portable access node 124 as an access node of the home communication system 110, e.g., by updating a database 129 stored in a computer-readable medium located at the tracking entity server 128 or located at another server in the core network of the home communication system 110.

At operation 220, the portable access node 124 provides cellular communication services, via its cellular transceiving circuitry and over the RF spectrum of the home communication system 110, to mobile terminals of the home communication system 110 that are not roaming. The core network of the home communication system 110 refers to the database 129 maintained by the tracking entity server 128 to route data to and from the portable access node 124. This operation is similar to that of the portable access node 122 in FIG. 1, and is useful in providing additional coverage inside the coverage area of the home communication system 110 where signals from the access nodes 111, 112, 113 are weak, and/or where a large number of subscribing mobile terminals are present.

At operation 225, the portable access node 124 determines whether another radio frequency is available. For example, from the result of the frequency scan performed at operation 210, the processor of the portable access node 124 determines whether there is another access node whose cellular signal is available at the location of the portable access node 124. When another access node of a local communication system other than the home communication system 110 is found (Yes from operation 225), the processor of the portable access node 124 determines that the portable access node 124 is roaming, and proceeds to operation 235. Otherwise (No from operation 225), the processor ends the process at operation 230.

In at least one embodiment, as an alternative to ending the process at operation 230, the processor of the portable access node 124 performs the process again with another frequency scan for cellular signals, after a predetermined period of time and/or after the portable access node 124 is moved to a new location.

At operation 235, the portable access node 124 inquiries whether a portion of the RF spectrum assigned to the local communication system 140, one or more access nodes 141, 142, 143 of which was/were found in the frequency scan by the portable access node 124, is available for leasing. For example, the processor of the portable access node 124 controls its network interface circuitry to transmit an inquiry to a frequency repository server 340 of the local communication system 140, as described with respect to FIG. 3. In at least one embodiment, whether a portion of the RF spectrum of the local communication system 140 is available for leasing depends on a load of one or more access nodes of the local communication system 140. For example, the access node 141, which was discovered in the frequency scan of the portable access node 124, currently has 3 connected mobile terminals and is configured to handle a maximum of 10 connected mobile terminals. The 3 connected mobile terminals occupy only a portion of the RF spectrum assigned to the access node 141. Therefore, a remaining portion of the RF spectrum assigned to the access node 141 is currently unused and is available for leasing, subject to any other policy of the local communication system 140. When RF spectrum leasing is available (Yes from operation 235), the processor of the portable access node 124 proceeds to operation 240. Otherwise (No from operation 225), the processor returns to operation 225 to look for another leasing option.

At operation 240, the portable access node 124 transmits a lease request to lease the available portion of the RF spectrum of the local communication system 140. For example, the processor of the portable access node 124 controls its network interface circuitry to transmit the lease request to the frequency repository server 340, as described with respect to FIG. 3.

At operation 245, upon receiving a response granting the lease request (Yes from operation 245), the processor of the portable access node 124 proceeds to operation 250. However, when a response denying the lease request is received (No from operation 245), the processor of the portable access node 124 returns to operation 225 to look for another leasing option. Such denial occurs, for example, in a situation where a recent change in the load of the local communication system 140 makes RF spectrum leasing no longer available, despite the previous confirmation of lease availability transmitted to the portable access node 124.

At operation 250, the portable access node 124 registers with the tracking entity server 128, in a manner similar to operation 215.

At operation 255, the portable access node 124 provides one or more cellular communication services, via its cellular transceiving circuitry and over the leased portion of the RF spectrum (hereinafter, the leased RF spectrum) of the local communication system 140, to roaming mobile terminals that subscribe to the home communication system 110, e.g., the roaming mobile terminal 118. In at least one embodiment, except for the cellular communication between the portable access node 124 and the roaming mobile terminal 118 being performed over the leased RF spectrum, operation 255 is similar in other aspects to operation 220. The cellular communication between the portable access node 124 and the roaming mobile terminal 118 is performed in accordance with one or more terms of the granted lease. Such terms are transmitted from the local communication system 140 to the portable access node 124 when the lease is granted. Examples of terms of the granted lease include, but are not limited to, a time period (or duration) during which the portable access node 124 is permitted to provide the communication service over the leased RF spectrum, a maximum transmission power and/or a transmission direction of the cellular transceiving circuitry of the portable access node while providing the communication service over the RF spectrum, and a maximum number of roaming mobile terminals permitted to be connected to the portable access node 140 to receive the communication service.

At operation 260, the portable access node 124 determines whether the granted lease is terminated. When it is determined that the lease is not yet terminated (No from operation 260), the processor of the portable access node 124 returns to operation 255 to continue providing the cellular communication service over the leased RF spectrum. Otherwise (Yes from operation 260), the processor returns to operation 225 to look for another leasing option. In an example, the granted lease is terminated when the duration of the lease expires. In another example, the granted lease is terminated when the local communication system 140 determines that one or more other terms of the lease is violated. In a further example, the granted lease is terminated by the local communication system 140 when an increase in the load of the local communication system 140 occurs, e.g., more mobile terminals of the local communication system 140 are connected the access node 141 than expected when the lease was granted. As a result, the access node 141 has to take back the leased portion of its RF spectrum to accommodate the increased number of connected mobile terminals. In at least one embodiment, before terminating the lease, the access node 141 transmits a resource release request to the portable access node 124, requesting the portable access node 124 to release the leased RF spectrum. Upon receiving a resource release request or otherwise determining that the lease is terminated, the processor of the portable access node 124 controls its cellular transceiving circuitry to stop performing cellular communication over the leased RF spectrum, and switches to use or looks for another leasing option as described herein.

In at least one embodiment, while the cellular communication service is being provided over the leased RF spectrum, the portable access node 124 continues to look for another leasing option by periodically performing frequency scans as described with respect to operation 210 and/or performing one or more of operations 225, 235, 240, 245. For example, another leasing option is found when the portable access node 124 determines that there is another leasable portion of the RF spectrum of another local communication system or another access node of the local communication system 140, or when the portable access node 124 obtains a granted lease on such another leasable portion of the RF spectrum. The another leasing option, when found, permits the portable access node 124 to ensure uninterrupted cellular communication services to the roaming mobile terminals, by switching to perform cellular communication over another leased RF spectrum prior to or when the current lease is terminated.

Figure 3:
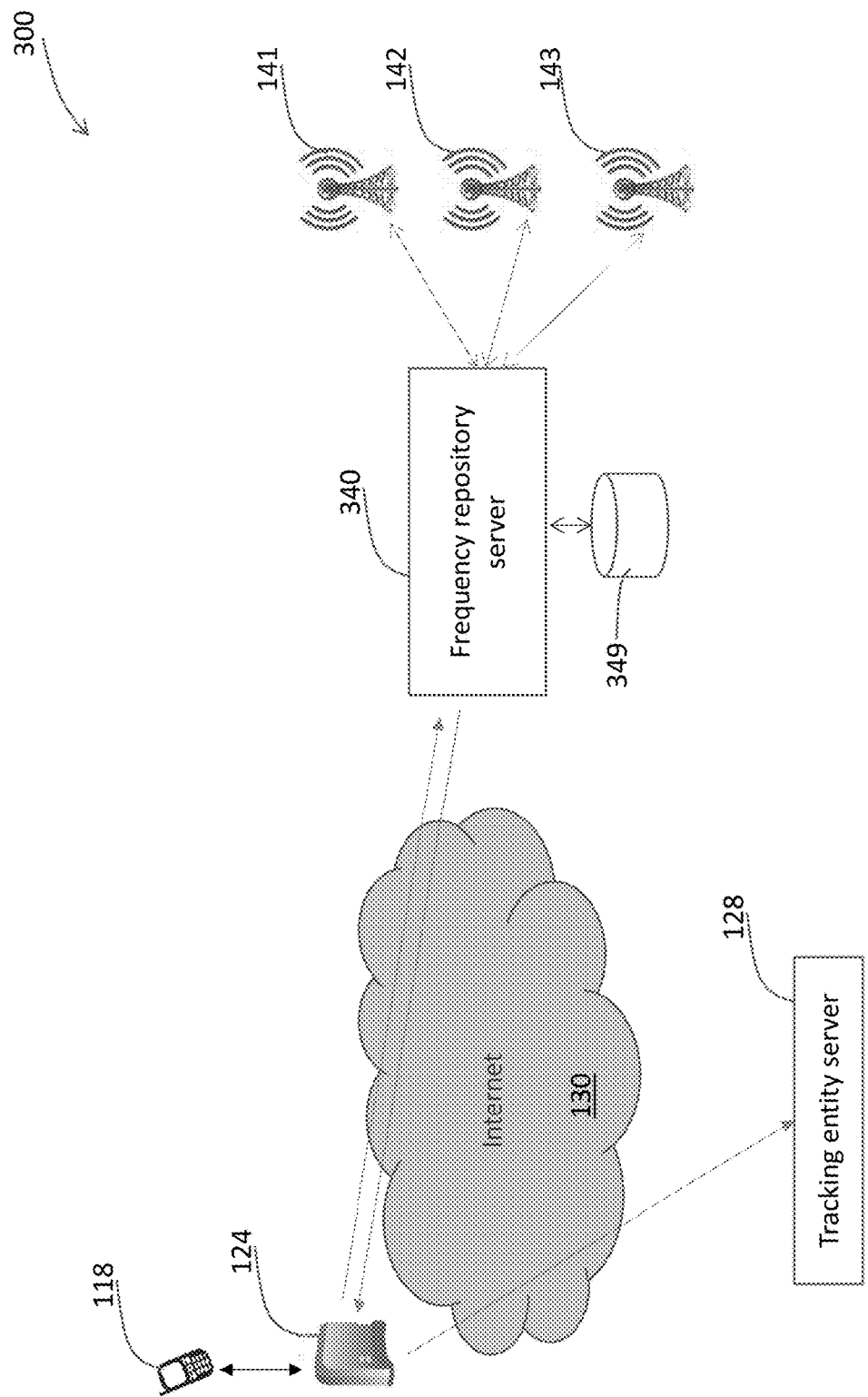
FIG. 3 is a block diagram of a section of a cellular system during an operation, in accordance with some embodiments.

FIG. 3 is a block diagram of a section 300 of the cellular system 100 during an operation, in accordance with some embodiments. The section 300 of the cellular system 100 includes equipment involved in one or more of operations of the method 200. Such equipment includes the roaming mobile terminal 118, portable access node 124, tracking entity server 128, local access nodes 141, 142, 143, and a frequency repository server 340.

The frequency repository server 340 is connected to the Internet 130 to communicate with the portable access node 124. In at least one embodiment, the frequency repository server 340 is part of a core network of the local communication system 140 including the access nodes 141, 142, 143. An example hardware configuration of the frequency repository server 340 is also described herein with respect to FIG. 4, but cellular transceiving circuitry is omitted in at least one embodiment. The frequency repository server 340 maintains and updates a database 349 of communication resources and/or load of the access nodes 141, 142, 143 of the local communication system 140. The database 349 is stored in a computer-readable medium located at the frequency repository server 340 or located at another server in the core network of the local communication system 140.

As described with respect to operation 210, the portable access node 124 performs a frequency scan, and finds one or more local access nodes at the location of the portable access node 124. For example, the portable access node 124 finds the access nodes 141, 142, 143 of the local communication system 140 in its frequency scan. In some situations, it is possible that the portable access node 124 finds access nodes of more than one local communication systems. For example, when deployed in the USA, it is possible that the portable access node 124 finds access nodes of several local communication systems, or MNOs, such as T-MOBILE®, VERIZON®, AT&T®, all available at the same location.

As described with respect to operation 235, the portable access node 124 transmits an inquiry to the frequency repository server 340 to inquiry about leasable RF spectrum, i.e., an inquiry whether a portion of the RF spectrum assigned to any of the found access nodes 141, 142, 143 is available for leasing. In situations where portable access node 124 finds access nodes of more than one local communication systems, multiple inquiries are transmitted by the portable access node 124 to respective frequency repository servers of the local communication systems. Alternatively, where a frequency repository server serves several local communication systems, an inquiry from the portable access node 124 to such frequency repository server is sufficient. In response to the inquiry about leasable RF spectrum received from the portable access node 124, the frequency repository server 340 consults the database 349, determines where an access node in the inquiry has leasable RF spectrum, and returns to the portable access node 124 a list of access nodes with leasable RF spectrum. A determination where an access node has leasable RF spectrum is performed by a processor of the frequency repository server 340, based on the load of the access node as described herein.

Upon receiving the list of access nodes with leasable RF spectrum from the frequency repository server 340, the portable access node 124 arranges the access nodes in the list in order. For example, assuming that all access nodes 141, 142, 143 are included in the list returned from the frequency repository server 340, the processor of the portable access node 124 arranges the access nodes on the list in a descending or acceding order of priority of the access nodes. In at least one embodiment, priority of an access node corresponds to the amount or size of leasable RF spectrum available at the access node, i.e., the larger the amount or size of leasable RF spectrum available at an access node, the higher priority of the access node. Other factors, such as signal strengths, are used in various embodiments to prioritize access nodes on the list returned from the frequency repository server 340.

As described with respect to operation 240, the portable access node 124 transmits a lease request to the frequency repository server 340, to lease the available leasable RF spectrum of at least one of the access nodes 141, 142, 143, starting from the access node 141 having the highest priority. If the access node 141 no longer has leasable RF spectrum, the same or a different lease request asks for a lease of RF spectrum from the access node 142 with the next lower priority, and so on. When a lease request is granted by the frequency repository server 340, the frequency repository server 340 instructs the access node, e.g., 141, to reserve the unused portion of its RF spectrum to be leased, and transmits to the portable access node 124 a lease grant indicating the leased RF spectrum and one or more terms of the granted lease. The portable access node 124 then proceeds to register with the tracking entity server 128 and to provide cellular communication services to roaming mobile terminals over the leased RF spectrum, as described with respect to operations 255, 260. In at least one embodiment, while cellular communication services are being provided over the leased RF spectrum of the access node 141, the portable access node 124 continues to look for another leasing option among access nodes having lower priority, starting from the access node 142 with the next lower priority, and so on. The list of access nodes with leasable RF spectrum and/or priority of the access nodes is/are periodically updated by the portable access node 124 and/or the frequency repository server 340 in accordance with, e.g., the current load of the access nodes.

As described herein, one or more embodiments make it possible to obviate roaming charges and/or roaming-related service limitations, by a portable access node which leases a unused portion of a communication resource from a local communication system, and provides cellular communication services to one or more roaming mobile terminals over the leased portion of the communication resource.

Figure 4:
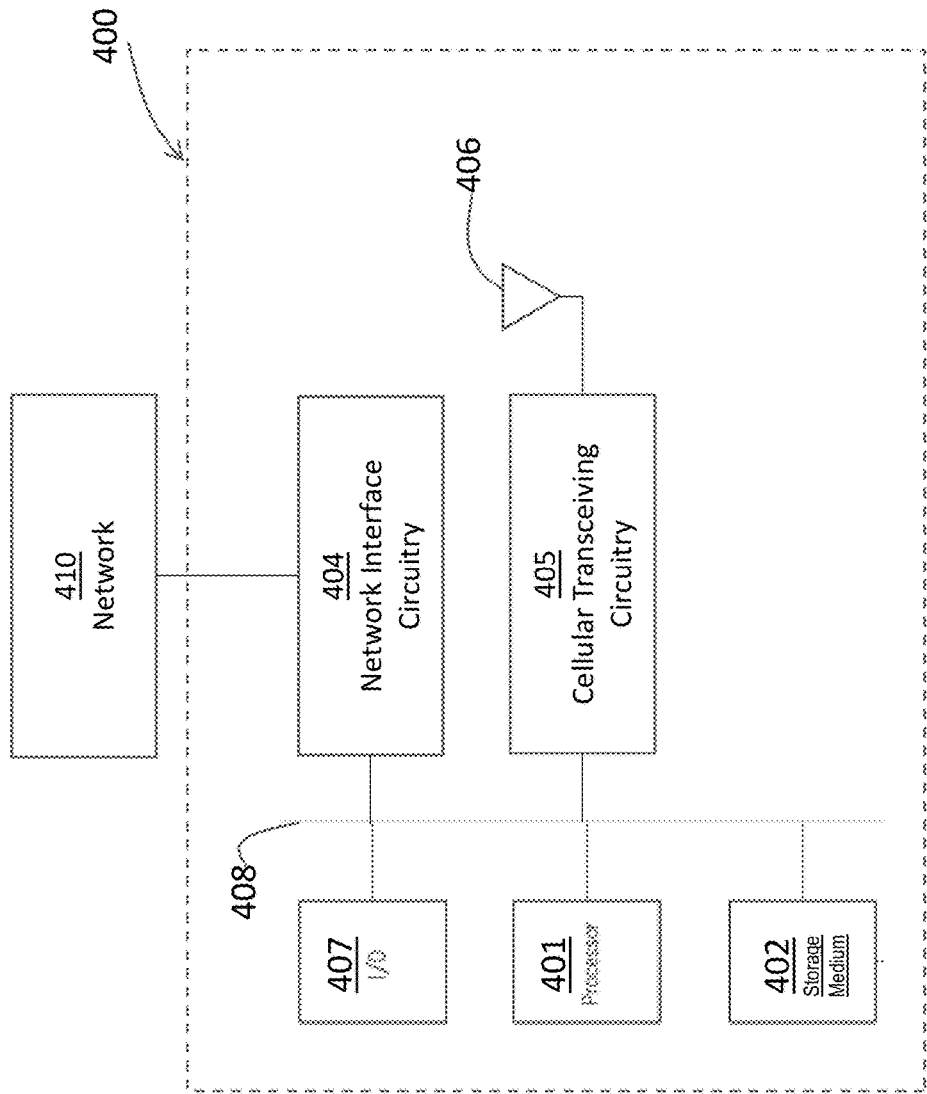
FIG. 4 is a block diagram of an example hardware configuration of equipment in a cellular system, in accordance with some embodiments.

FIG. 4 is a block diagram of an example hardware configuration of equipment 400 in a cellular system, in accordance with some embodiments. The equipment 400 is configurable to operate as the portable access nodes 122, 124, 126, mobile terminals 116, 117, 118, 119, tracking entity server 128, frequency repository server 340, and the access nodes and/or equipment in the core network of one or more of communication systems 110, 140, 160. The equipment 400 comprises a hardware processor 401, a non-transitory, computer-readable storage medium 402, network interface circuitry 404, cellular transceiving circuitry 405 with at least one associated antenna 406, an input/output (110) interface 407, and a bus 408 which couples the processor 401, the storage medium 402, the network interface circuitry 404, the cellular transceiving circuitry 405 and the I/O interface 407 together. As described herein, in equipment where cellular communication is not required, the cellular transceiving circuitry 405 and the associated antenna 406 are omitted.

The processor 401 is configured to execute computer program codes encoded in the storage medium 402 in order to cause the equipment 400 to perform a portion or all of the described processes and/or methods. In one or more embodiments, the processor 401 comprises a central processing unit (CPU), a multi-processor, a distributed processing system, an application specific integrated circuit (ASIC), and/or a suitable processing unit.

The storage medium 402, amongst other things, is encoded with, i.e., stores, computer program codes, i.e., a set of executable instructions to be executed by the processor 401. In one or more embodiments, the storage medium 402 comprises an electronic, magnetic, optical, electromagnetic, infrared, and/or a semiconductor system (or apparatus or device). For example, the storage medium 402 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the storage medium 402 includes a compact disk-read only memory (CD-ROM), a compact disk-read/write (CD-R/W), and/or a digital video disc (DVD).

The network interface circuitry 404 is coupled to a network 410 so that the processor 401 and storage medium 402 are capable of connecting to other equipment via the network 410. The network interface circuitry 404 includes wireless network interfaces such as BLUETOOTH, WIFI, WIMAX, or wired network interfaces such as ETHERNET, USB, or IEEE-1364.

The cellular transceiving circuitry 405 includes receiver circuitry with an associated decoder, and transmitter circuitry with an associated encoder. The cellular transceiving circuitry 405 is configured to receive and transmit data over cellular communication under control of the processor 401.

The I/O interface 407 includes an input device, an output device and/or a combined input/output device for enabling a user and/or external circuitry/equipment to interact with equipment 400. An input device comprises, for example, a keyboard, keypad, mouse, trackball, trackpad, touchscreen, and/or cursor direction keys for communicating information and commands to the processor 401. An output device comprises, for example, a display, a printer, a voice synthesizer, etc. for communicating information to a user.

In some embodiments, a portion or all of the described processes and/or methods is implemented as a standalone software application for execution by a processor. In some embodiments, a portion or all of the described processes and/or methods is implemented as a software application that is a part of an additional software application. In some embodiments, a portion or all of the described processes and/or methods is implemented as a plug-in to a software application.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In a method of operating a portable access node in accordance with some embodiments, a lease request is transmitted to lease a portion of a communication resource assigned to but not used by a local communication system, where the portable access node is located within a coverage area of the local communication system. Upon receiving a response granting the lease request, a communication service using the leased portion of the communication resource is provided.

In some embodiments, a femtocell base station comprises cellular transceiving circuitry, network interface circuitry, and a processor. The processor is configured to control the cellular transceiving circuitry to scan for a local access node at a location of the femtocell base station. Upon discovering at least one local access node at the location of the femtocell base station, the processor is configured to control the network interface circuitry to transmit, to a frequency repository server associated with the at least one local access node, a lease request to lease a portion of a radio frequency spectrum of the at least one local access node. Upon receiving a response granting the lease request, the processor is configured to control the cellular transceiving circuitry to perform cellular communication over the leased portion of the radio frequency spectrum.

In some embodiments, a cellular system comprises a home communication system configured to provide a cellular communication service to mobile terminals subscribed to the home communication system, and a femtocell base station arranged outside a coverage area of the home communication system. The femtocell base station is configured to lease an unused portion of a radio frequency spectrum of a local communication system which is different from the home communication system, the femtocell base station located within a coverage area of the local communication system. The femtocell base station is further configured to provide, over the leased portion of the radio frequency spectrum of the local communication system, the cellular communication service to a first, roaming mobile terminal subscribed to the home communication system but located within the coverage area of the local communication system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of operating a portable access node, the method comprising:
    transmitting a lease request to lease a portion of a communication resource assigned to but not used by a local communication system, wherein the portable access node is located within a coverage area of the local communication system;
    upon receiving a response granting the lease request, providing a communication service using the leased portion of the communication resource; and
    registering the portable access node, which provides the communication service using the leased portion of the communication resource, as an access node of a home communication system different from the local communication system.

2. The method of claim 1, wherein
    in said providing the communication service, the portable access node performs communication, using the leased portion of the communication resource, with a mobile terminal subscribed to the home communication system but located within the coverage area of the local communication system.

3. The method of claim 1, further comprising:
    determining whether a radio frequency spectrum of the home communication system is available at a location of the portable access node;
    in response to a determination that the radio frequency spectrum of the home communication system is available at the location of the portable access node,
        performing said registering the portable access node as the access node of the home communication system, and
        causing the portable access node to provide the communication service over the radio frequency spectrum of the home communication system; and
    in response to a determination that the radio frequency spectrum of the home communication system is not available at the location of the portable access node,
        determining whether another radio frequency spectrum is available at the location of the portable access node.

4. The method of claim 3, further comprising:
    in response to a determination that another radio frequency spectrum is available at the location of the portable access node,
        transmitting an inquiry whether said another radio frequency spectrum is available for leasing; and
    upon receiving a response that said another radio frequency spectrum is available for leasing
        transmitting said lease request.

5. The method of claim 1, further comprising:
    upon receiving a resource release request from the local communication system, stopping said providing the communication service using the leased portion of the communication resource.

6. The method of claim 1, wherein the leased portion of the communication resource comprises a part of a radio frequency spectrum of the local communication system.

7. The method of claim 6, wherein
said providing the communication service using the leased portion of the communication resource is performed in accordance with at least one of
   a time period during which the portable access node is permitted to provide the communication service,
   a maximum transmission power at which the portable access node is permitted to provide the communication service,
   a transmission direction in which the portable access node is permitted to provide the communication service, or
   a maximum number of mobile terminals permitted to be connected to the portable access node to receive the communication service.

8. A portable access node, comprising:
cellular transceiving circuitry;
network interface circuitry; and
a processor configured to:
   upon discovering at least one local access node of a local communication system at a location of the portable access node wherein the portable access node is located within a coverage area of the local communication system, control the network interface circuitry to transmit, to a frequency repository server associated with the at least one local access node, a lease request to lease a portion of a radio frequency spectrum assigned to but not used by the at least one local access node of the local communication system, and
   upon receiving a response granting the lease request, control the cellular transceiving circuitry to perform cellular communication over the leased portion of the radio frequency spectrum,
wherein the processor is further configured to control the network interface circuitry to transmit, to a tracking entity server, a registration message for registering the portable access node in the tracking entity server as an access node of a home communication system different from the local communication system containing the at least one local access node.

9. The portable access node of claim 8, wherein
the processor is configured to control the cellular transceiving circuitry to stop performing the cellular communication over the leased portion of the radio frequency spectrum in response to a resource release request originated from the at least one local access node.

10. The portable access node of claim 8, wherein
the processor is configured to control the cellular transceiving circuitry to stop performing the cellular communication over the leased portion of the radio frequency spectrum upon expiration of a time period during which the portable access node is permitted under the granted lease to perform the cellular communication over the leased portion of the radio frequency spectrum.

11. The portable access node of claim 8, wherein
the processor is configured to control the cellular transceiving circuitry to perform the cellular communication, over the leased portion of the radio frequency spectrum, with a mobile terminal subscribed to the home communication system but located within the coverage area of the local communication system.

12. The portable access node of claim 8, wherein
the processor is configured to control the network interface circuitry to
   transmit, to the frequency repository server, an inquiry whether any local access node at the location of the portable access node has a unused portion of the radio frequency spectrum, and
   upon receiving from the frequency repository server a list of local access nodes having unused portions of the radio frequency spectrum, transmit, to the frequency repository server, the lease request to lease at least one of the unused portions of the radio frequency spectrum in accordance with a descending order of priority of the local access nodes on the list.

13. The portable access node of claim 12, wherein
during a duration of a lease of the unused portion of the radio frequency spectrum of a first local access node on the list, the processor is configured to
   control the network interface circuitry to transmit, to the frequency repository server, the lease request to lease the unused portion of the radio frequency spectrum of a second local access node on the list, the second local access node having a next lower priority than the first local access node, and
   control the cellular transceiving circuitry to perform the cellular communication over the unused portion of the radio frequency spectrum of the second local access node upon termination of the lease of the unused portion of the radio frequency spectrum of the first local access node.

14. The portable access node of claim 12, wherein
the order of priority of the local access nodes on the list is based on a leasable amount of the radio frequency spectrum available at, or a signal strength of, each of the local access nodes on the list.

15. A cellular system, comprising:
a home communication system configured to provide a cellular communication service to mobile terminals subscribed to the home communication system; and
a portable access node comprising cellular transceiving circuitry, network interface circuitry, and a processor configured to:
   upon discovering at least one local access node of a local communication system at a location of the portable access node wherein the portable access node is located within a coverage area of the local communication system, control the network interface circuitry to transmit, to a frequency repository server associated with the at least one local access node, a lease request to lease a portion of a radio frequency spectrum assigned to but not used by the at least one local access node of the local communication system, and
   upon receiving a response granting the lease request, control the cellular transceiving circuitry to perform cellular communication over the leased portion of the radio frequency spectrum,
wherein the processor is further configured to control the network interface circuitry to transmit, to a tracking entity server, a registration message for registering the portable access node in the tracking entity server as an access node of the home communication system different from the local communication system containing the at least one local access node.

16. The cellular system of claim 15, further comprising:
the tracking entity server.

17. The cellular system of claim 15, wherein the portable access node, located inside a coverage area of the home communication system, is configured to provide, over a radio frequency spectrum of the home communication system, the cellular communication service to a mobile terminal subscribed to the home communication system and located inside the coverage area of the home communication system.

18. The cellular system of claim 17, wherein
the portable access node, located inside the coverage area of the home communication system, is configured to send a further registration message to the tracking entity server, and
upon receiving the further registration message, the tracking entity server is configured to register the portable access node as a further access node of the home communication system.

19. The cellular system of claim 18, wherein
the tracking entity server is part of the home communication system.

20. The cellular system of claim 15, wherein
the portable access node, located inside the coverage area of the local communication system and outside a coverage area of the home communication system, is configured to provide, over the leased portion of the radio frequency spectrum of the local communication system, the cellular communication service to a roaming mobile terminal subscribed to the home communication system but located within the coverage area of the local communication system.

* * * * *